UNITED STATES PATENT OFFICE.

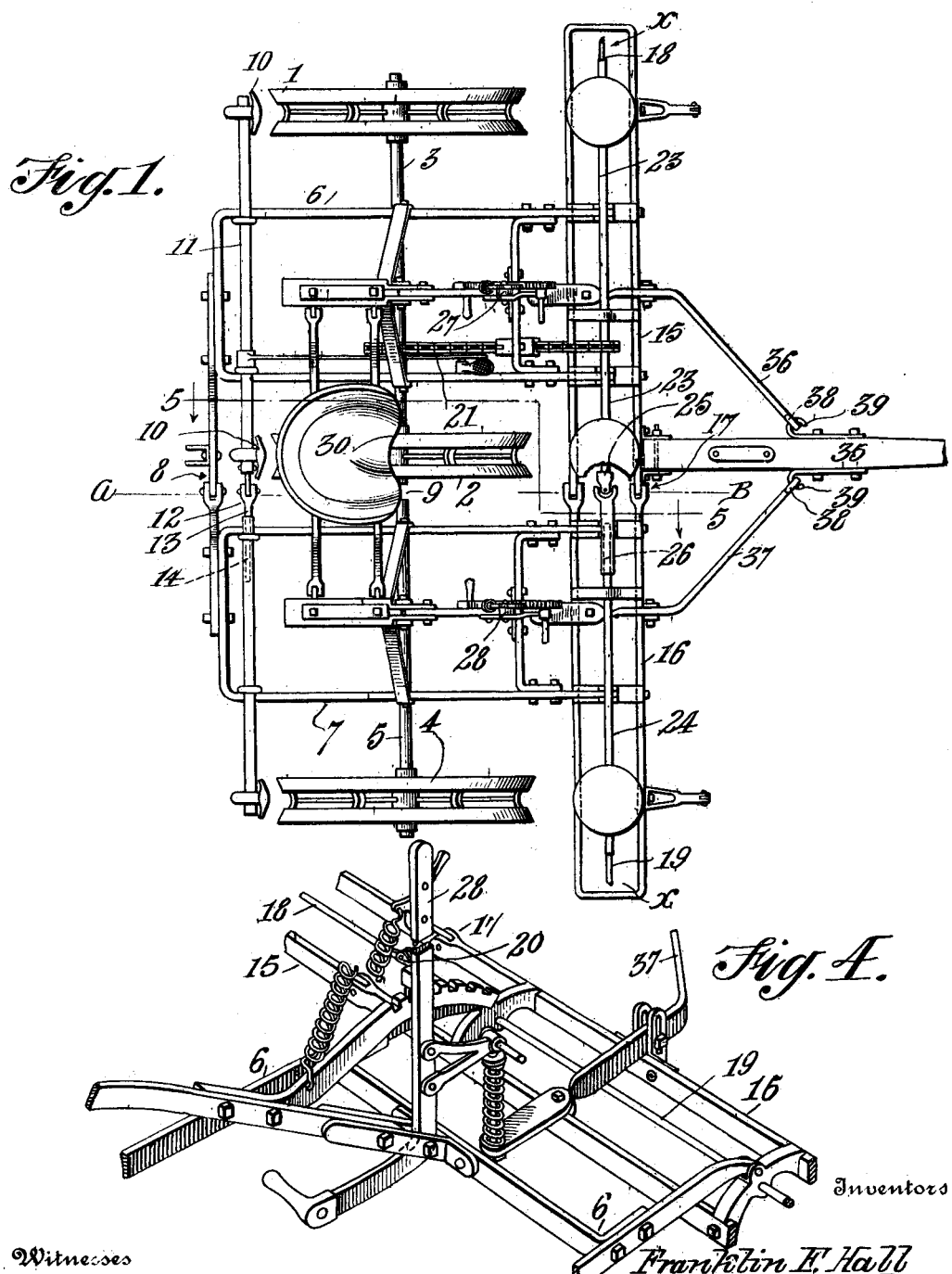

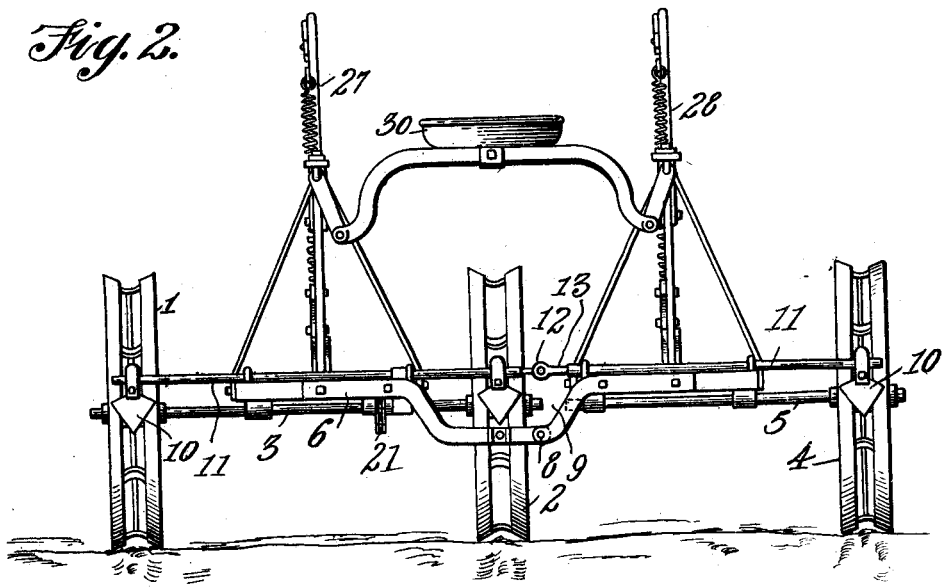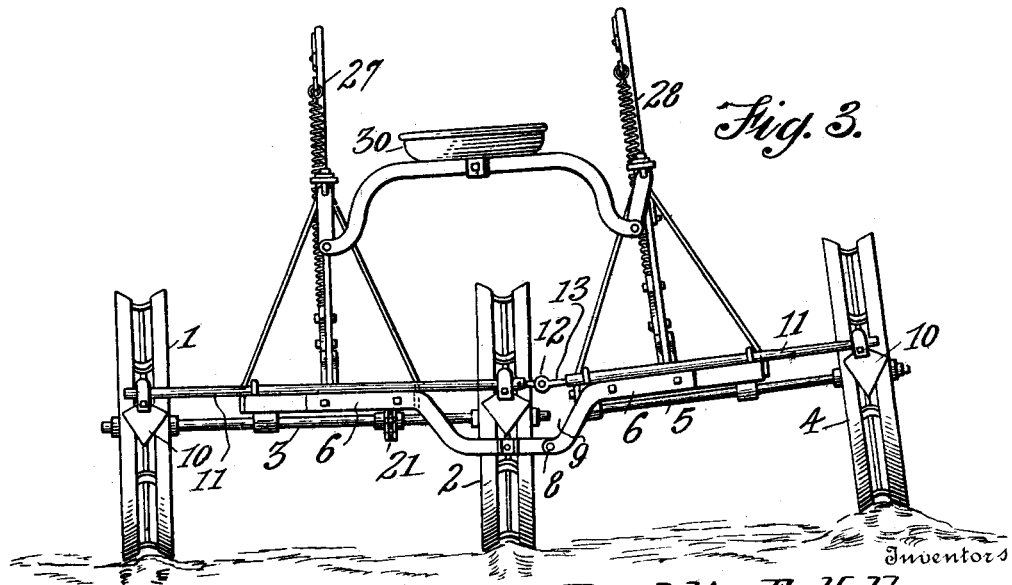

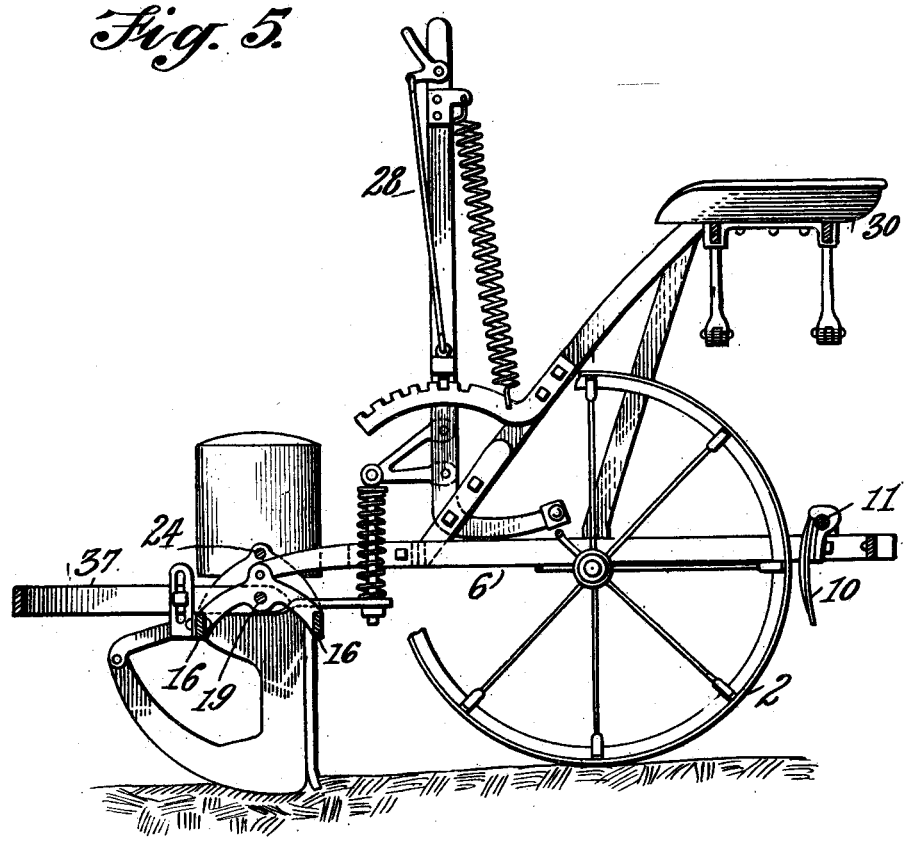

FRANKLIN F. HALL AND RAY U. HALL, OF DEFIANCE, OHIO.

CORN-PLANTER.

1,119,152.      Specification of Letters Patent.      Patented Dec. 1, 1914.

Application filed November 10, 1913. Serial No. 800,209.

*To all whom it may concern:*

Be it known that we, FRANKLIN F. HALL and RAY U. HALL, citizens of the United States, residing at Defiance, in the county of Defiance and State of Ohio, have invented certain new and useful Improvements in Corn-Planters, and we do declare the following to be a full, clear, and exact description of the invention, such as will enable others skilled in the art to which it appertains to make and use the same.

This invention relates to corn planters, or in fact to any type of seed planter whether actuated by a check row wire or by power taken from the axle, and the primary object of the same is to construct such a machine so that it will do the planting on rough or uneven ground just as well as on level or mellow ground, and will plant three rows at a time instead of two rows—thereby doing fifty per cent. more work. A further advantage resulting from the machine is that the horses walk between the rows so that the seed is not dropped in their footsteps or tracks and therefore grows evenly, the seed being dropped in the paths between the horse-tracks.

The invention is carried out by providing a novel hinge connection between the side section of the main frame and the side sections of the dropper frame, and universal joints between the shafts in these sections. The invention also contemplates the employment of two levers, one of which controls the dropper frame and two feed boxes at one side of said hinge, and the other of which controls the dropper frame and single feed box at the other side of said hinge.

Details are set forth in the following specification and are shown in the drawing wherein—

Figure 1 is a plan view of this machine complete. Fig. 2 is a rear elevation showing it traveling on substantially level ground, and Fig. 3 a similar view showing it traveling on uneven ground with the right hand wheel raised. Fig. 4 is a perspective view of one end of the front portion of the machine, with the seed boxes, dropper shafts, and shoes omitted. Fig. 5 is a longitudinal section on the line 5—5 of Fig. 1.

The type of corn planter to which our invention is applied is not essential, and therefore we lay no claim to its details of construction, not even to those parts hereinafter mentioned of necessity because they coact with the features of our invention. The latter may, in fact, be applied to many varieties of corn planters and other planters.

In building our first machine we took a two-row corn planter having two wheels and a dropper frame with two boxes adjustable by a hand lever, and removed the draft mechanism. Then we took another similar machine and removed its draft mechanism and one wheel and one feed box, and connected that end of the machine and dropper frame from which the parts were removed, with the adjacent end of the other corn planter, finally applying a draft mechanism at about the transverse center of the machine thus built up. On this understanding, Fig. 1 shows a three-wheel machine with two of its wheels 1 and 2 on one axle 3, and the other wheel 4 on another axle 5 which is independent of the first axle. The axles are mounted in frame sections 6 and 7 which have offset ends hingedly connected with each other at the point 8, the contiguous ends of the axle sections being separated from each other at the point 9 between the offset ends of the frame sections. The scrapers 10 have their shaft sections 11 connected by a universal joint 12, one member of which may be fixed to one shaft section while the other member 13 of said joint telescopes with the tubular end of the other shaft section 11. The obvious purpose is that when the main frame flexes on the hinge line 8 the scraper-shaft may bend at the universal joint as is permitted by the telescoping details. The dropper frame is also made in two sections 15 and 16 which are hingedly connected with each other on the line and at the point 17, said line being indicated at A—B in Fig. 1 as extending longitudinally through the machine and as near as possible to its transverse center. The check shaft is also made in sections 18 and 19 connected by a joint 20; and obviously this shaft may be actuated by check-row mechanism located at points X in the drawings. The dropper shaft is also made in sections 23 and 24 connected by a universal joint 25 of which shaft member 26 is tubular and telescopes with one section 24. The dropper shaft may be driven by the check shaft, or by connections with the axle as shown at 21. Hand levers 27 and 28 are connected with the two dropper frame sections and are disposed at either side of the seat 30 and within reach of the operator sitting thereon. These levers work independently of each other, and permit the operator to put more pressure onto either side of the machine as required in case one shoe should be in mellow soil and either one or the other of the shoes in hard soil, or in case the center of the machine should strike a ditch or depression in the earth's surface.

The draft mechanism comprises an ordinary tongue 35 disposed a little to one side of the hinge line A—B, and a pair of hounds 36, 37 connected at their rear ends with the dropper frame sections 15 and 16 and having eyes 38 in their front ends loosely engaging eyes or hooks 39 secured to the sides of the tongue. By this means the draft is applied near the center of the machine and by the hounds to the dropper frame sections in such manner as to permit said sections to rise and fall as required.

With a machine of this kind two horses are hitched to the tongue by ordinary means not necessary to illustrate, and they travel in the spaces between rows or between the lines where the rows of corn or seed are to be planted, and this machine drops three rows at a time—one row between the horse-tracks and other rows at opposite sides thereof on the level ground and the corn therefore comes up evenly. Another advantage resulting from the construction set forth is that in case one side wheel or the central wheel passes over an obstruction (see Fig. 3) the entire main frame and the dropper frame may flex along the hinge line A—B without interrupting the seeding process. By the word "obstruction" we do not mean an ordinary stone, but rather a rise in the ground through which the shoe of the ordinary planter would plow to an equal depth with the other shoe and plant the seed deeper as will be clear. By the use of our machine, however, one wheel will travel over said obstruction or rise in the ground as indicated in Fig. 3 and the seed will be planted at an equal depth from the true surface of the earth. The same result would follow if the central wheel or the other side wheel traveled over an obstruction. In other words, the main frame and the dropper frame can flex along the line A—B so that the machine accommodates itself to unevennesss in the ground without attention on the part of the operator. The fact that some of the rotating parts are located on a line above the hinge line 8 between the main frame sections, requires that the universal joint interposed between the dropper-shaft-sections shall telescope at one or the other sides of the joint, so that the shaft may extend slightly when the frame flexes in one way and may contract slightly when the frame flexes in the other way.

The uses of machines of this kind are too well known to need elaboration here.

What is claimed as new is:

In a corn planter the combination of a hingedly connected sectional frame, longitudinally alined axles mounted in said frame with their inner ends spaced apart at points registering with the hinges of said frame sections, scraper, dropper and check shafts made in pivotally connected sections, the pivotal points of which register with the connections of the other members, said dropper and scraper shafts being connected by universal joints having telescopic connection with one of the sections thereof, and pressure applying levers independently mounted on said frame sections.

In testimony whereof we have hereunto set our hands in presence of two subscribing witnesses.

FRANKLIN F. HALL.
RAY U. HALL.

Witnesses:
GEORGE M. KILLEY,
JOHN D. LAMB.